United States Patent [19]

Mott et al.

[11] Patent Number: 5,269,687

[45] Date of Patent: Dec. 14, 1993

[54] SYSTEM AND METHOD FOR RECURSIVE DRIVER TRAINING

[75] Inventors: Stephanie J. Mott, Sunnyvale; Rick L. Moncrief, San Jose; Max L. Behensky, Hayward, all of Calif.

[73] Assignee: Atari Games Corporation, Milpitas, Calif.

[21] Appl. No.: 18,340

[22] Filed: Feb. 16, 1993

Related U.S. Application Data

[63] Continuation of Ser. No. 561,087, Aug. 1, 1990, abandoned.

[51] Int. Cl.⁵ .............................................. G09B 9/04
[52] U.S. Cl. ............................... 434/69; 434/65; 434/307; 434/373; 364/410; 364/578; 273/86 B; 273/434; 273/454; 273/DIG. 28
[58] Field of Search ..................... 434/29, 38, 43, 62, 434/65, 69, 307, 308, 373; 358/104; 340/724, 725; 364/410, 578; 273/85 G, 86 R, 86 B, 434, 437, 440, 442, 445, 454, DIG. 28

[56] References Cited

U.S. PATENT DOCUMENTS

| | | | |
|---|---|---|---|
| 4,383,827 | 5/1983 | Foerst ....................... | 434/69 |
| 4,750,888 | 6/1988 | Allard et al. ................ | 434/64 X |
| 5,005,148 | 4/1991 | Behensky et al. ........... | 434/69 X |
| 6,716,458 | 12/1987 | Heitzman et al. . | |

FOREIGN PATENT DOCUMENTS 3816543 11/1989 Fed. Rep. of Germany .
8620293 4/1990 Fed. Rep. of Germany .

OTHER PUBLICATIONS

Atari Games Corporation, "HARD DRIVIN'OPERATOR'S MANUAL", 3rd printing, cover page, notice page and pp., 1-4-1-5, 1989.
Atari Games Corporation, "HARD DRIVIN'", advertising brochure, 1988.

Primary Examiner—Richard J. Apley
Assistant Examiner—Joe H. Cheng
Attorney, Agent, or Firm—Knobbe, Martens, Olson & Bear

[57] ABSTRACT

A driver training system for a user of a simulated vehicle. The system includes input devices for controlling the simulated vehicle, a video display having three-dimensional graphics, modeling software for determining position information based on the input devices, and recursive training software to display a previous route through an environment simultaneously with a present route through the environment. The user then incrementally and recursively maximizes parameters associated with vehicle operation skill. The driver training system may be embodied as an arcade game.

12 Claims, 6 Drawing Sheets init_precord init_lap_car

SYSTEM AND METHOD FOR RECURSIVE DRIVER TRAINING

This application is a continuation of application Ser. No. 07/561,087, filed Aug. 1, 1990, now abandoned.

BACKGROUND OF THE INVENTION

1. Field of the Invention

The present invention generally relates to automated training and, more particularly, is concerned with vehicle simulators.

2. Description of the Prior Art

A vehicle simulator can be defined as a system that simulates the operating conditions of a vehicle in an environment. Where the vehicle simulated is a car, the environment would typically include a road. The environment in this case may also include weather conditions such as rain or snow. Besides cars, examples of other types of vehicles that may be simulated include airplanes, ships, submersibles and space vehicles.

Vehicle simulators provide the means to efficiently train operators. That is, a simulator can be used where an operator has a need to safely learn how to operate the particular vehicle being simulated. Rather than train an operator on a real-world vehicle, the simulator is used to avoid accidents. Clearly, experience garnered through making mistakes on a simulator is invaluable when compared to the inherent risks of vehicle damage, and moreover, operator injury, associated with making a driving error in a real-life situation.

In some sense, a simulator achieves a balance between testing the operator's knowledge of the "rules of the road" and testing the operator's use of a vehicle. Testing the operator's knowledge is typically and conveniently accomplished through written and/or verbal examinations. However, examinations are of limited usefulness for operator training. For example, operator reflexes are not tested at all, and, moreover, such examinations do not adequately address the skills necessary for real-time decision-making.

Besides concerns for operator safety, the other alternative, actual vehicle operation, has its pitfalls too. First, the cost of instructor time may be prohibitive. Furthermore, the actual vehicle itself, such as for space or undersea operation, may simply not be available. Lastly, there is always the risk of an accident when a student is training on an actual vehicle under realistic conditions. Although a certain amount of training may occur in benign environments, for example, learning to drive a car in an empty parking lot, there comes a time, early in the operator's training, where driving in an unrealistic environment is no longer useful and practical.

Vehicle simulators address the issue of presenting the operator with a realistic training environment. The principal shortcoming of existing training systems, however, is that they are not providing realistic feedback for incremental learning. For example, in most known systems there is no way to instantaneously gauge one's progress against a prior use of the vehicle while it is in operation.

Video arcade games are another technology providing a certain degree of user feedback. Arcade games are typically placed in public areas such as arcade halls, theatres, airports and other such areas where the users can occupy time and entertain themselves by playing the game. Arcade games utilizing video displays have been around for some time now, beginning with the simplistic game of bouncing a ball across a line with paddles known as "Pong". However, with the passage of time, video arcade games have become ever more sophisticated and realistic.

Since arcade games have housings which occupy a limited space, the computer equipment of the game is subject to strict space constraints. In addition, the user's interest must be captured and maintained by the simulator, thus requiring that processing be accomplished in real-time. The competing space and time goals thus make the task of injecting realism into the games more difficult.

In many senses, the arcade game called "Hard Drivine' TM", manufactured and distributed by Atari Games Corp. of Milpitas, Calif., represents the state of the art in arcade game realism. The physical layout of the game includes clutch, brake and gas pedals, a gearshift and a steering wheel. The user, or driver, is provided feedback response from a video display having a three-dimensional graphical representation of the driving environment and from a speaker which generates realistic sounds of driving. A digital processor, comprising a number of microprocessors and a memory, is the interface between the user inputs and the feedback response.

Many current arcade games, including the one previously described, require that the user compete against some unknown "best" or "champion" player who has played the game at some point in the past. A player becomes a new champion by maximizing some metric or set of parameters and thereby displacing a previous champion. Besides the noted issue of anonymity, in most of these arcade games the only indicia of the champion's skill level is a single numeric score. Hence, there is no indication of what moves, speeds, etc., the champion used to obtain the high score. A recording of a game would be most important if the user desired to improve his skill level as against someone having greater skill at playing the game such as the champion.

Other systems have incorporated the device of connecting two arcade games together and having users compete against one another with full knowledge of who they are competing against, their actions being coordinated and displayed simultaneously. In such multiple machine configurations, a serious disadvantage is that it is costly to the proprietor since the play area doubles and the cost of machines doubles for the given game. Furthermore, these games do not present an indication of what moves an individual player needs to improve on if the competing player happens to be less skillful than his counterpart.

Consequently, a need exists for realistic vehicle simulators and arcade games to provide personalized feedback, wherein the feedback may be personalized by either the operator/user or by an instructor/champion.

SUMMARY OF THE INVENTION

The aforementioned needs are satisfied by the present invention which includes a driver training system for a user of a simulated vehicle, comprising a plurality of simulated input devices for controlling the simulated vehicle. For the example of a car simulator, input devices may include gas, brake and clutch pedals, a gearshift and a steering wheel responsive to feedback signals. The driver training system further includes a video display for presenting the user with a view of a simulated environment. The driver training system also includes a modeling means responsive to the input devices for determining position information of the simulated vehicle in the simulated environment. The driver training system yet further includes a recursive training means having a memory and responsive to said position information for storing a previous route of the simulated vehicle through the simulated environment wherein the previous route is communicated along with a present route to the video display. The present invention can also be embodied as an arcade game.

These and other objects and features of the present invention will become more fully apparent from the following description and appended claims taken in conjunction with the accompanying drawings.

DETAILED DESCRIPTION OF THE PREFERRED EMBODIMENTS

Reference is now made to the drawings wherein like numerals refer to like parts throughout.

Figure 1:
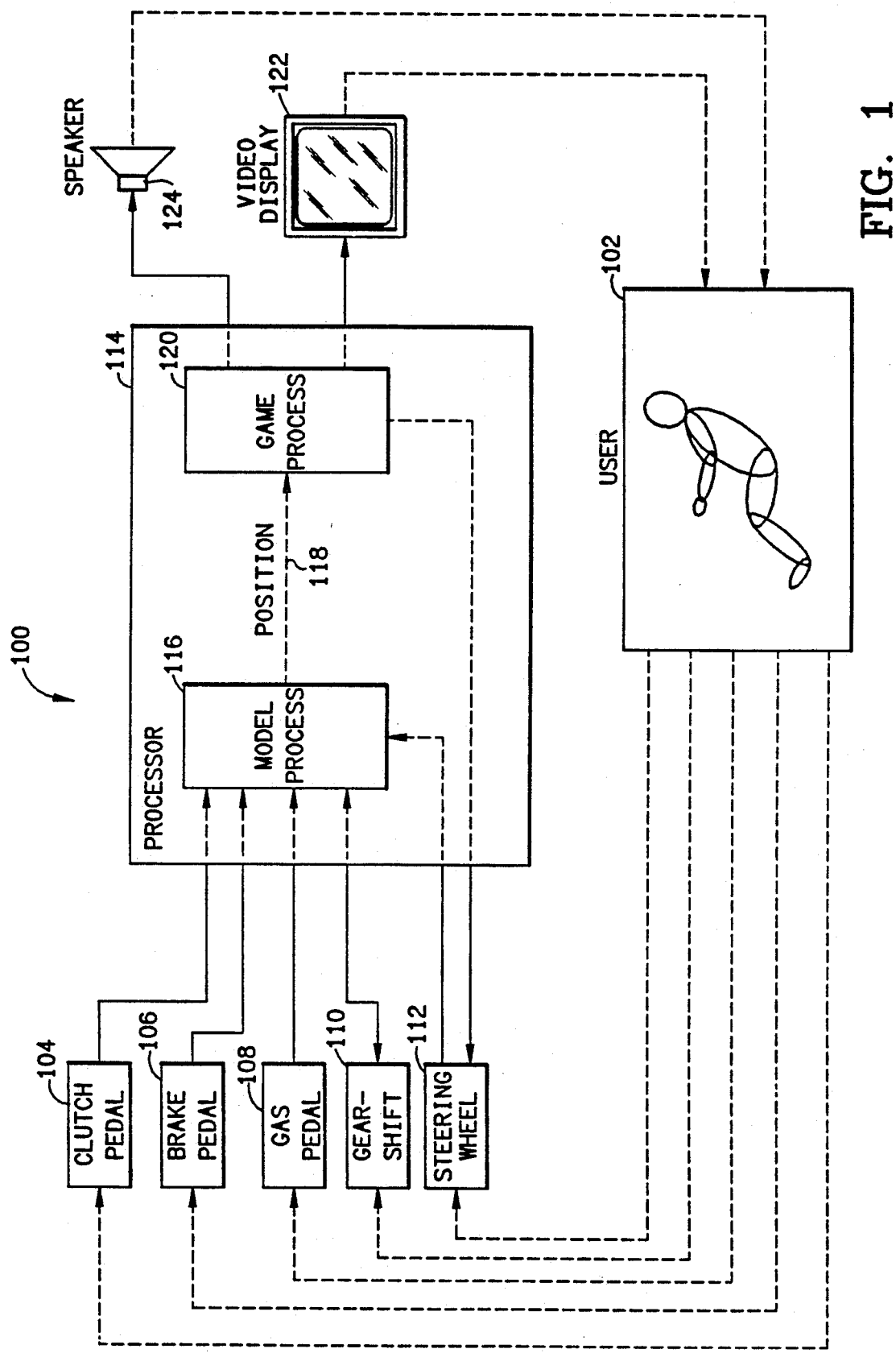
FIG. 1 is a block diagram of one preferred arcade game of the present invention.

FIG. 1 shows one preferred embodiment of a driver training system 100 of the present invention. The driver training system 100 is operated by a user or driver 102 (shown schematically), who desires to improve driving performance. It should be understood that the driver training system 100 as hereinafter described is applicable to any type of vehicle that is operated by a human. Also, the embodiment of the driver training system 100 as presented in the following figures and description is presented as an arcade game for racing. However, the present invention includes a personalized feedback response that is easily generalized to driver training systems for all kinds of simulated vehicles and types of driving.

In FIG. 1, the user 102 preferably sits in a booth or housing (not shown) such as the one described in the assignee's copending U.S. patent application entitled "Rear Entry Booth and Adjustable Seat Apparatus for a Sit-Down Arcade Video Game", Ser. No. 07/297,478, now U.S. Pat. No. 4,960,117. In that way, distractions are minimized and the user 102 can concentrate on self-improvement. The sitting position also better simulates the actual conditions associated with driving a car.

In the driver training system 100, the user 102 depresses a clutch pedal 104, brake pedal 106 and gas pedal 108 in the customary manner. In addition, a gearshift 110 is manipulated by the user 102 to maximize acceleration and deceleration for the given velocity of the vehicle as simulated by the simulator 100. A steering wheel 112 is turned by the user 102 so as to guide the simulated vehicle in the desired direction of travel.

The mechanical inputs provided by the user 102 to the input devices 104, 106, 108, 110 and 112 are translated by transducers into electrical signals which are fed into a processor 114. The processor 114 in the preferred embodiment includes a microprocessor (not shown) such as, for example, a Motorola 680×0. The processor 114 executes computer software which is stored in a memory (not shown) such as 27512 read-only memory (ROM) chips. The computer software in the processor 114 is logically organized to include a model process 116.

The model process 116 receives digitized signals from the input devices 104-112 and models the velocity and acceleration vectors of the simulated car. Thus, at a time T, position data, i.e., the Cartesian coordinates of the car, are determined by the model process 116. The position data is available, across a data path 118, to a game process 120. Accordingly, the game process 120 applies the "rules of the road" to the new position of the car, and initiates signals to drive a video display 122 and a speaker 124.

The video display 122 preferably generates a color, three-dimensional graphical representation of the environment, i.e., the user's perspective of a graphical universe including items such as a roadway. The speaker 124 produces sounds such as gear changes, engine revving, skidding, and so on. Thus, the user 102 is presented with real-time feedback from the output devices 122, 124 that is personalized according to his own individual performance.

Figure 2:
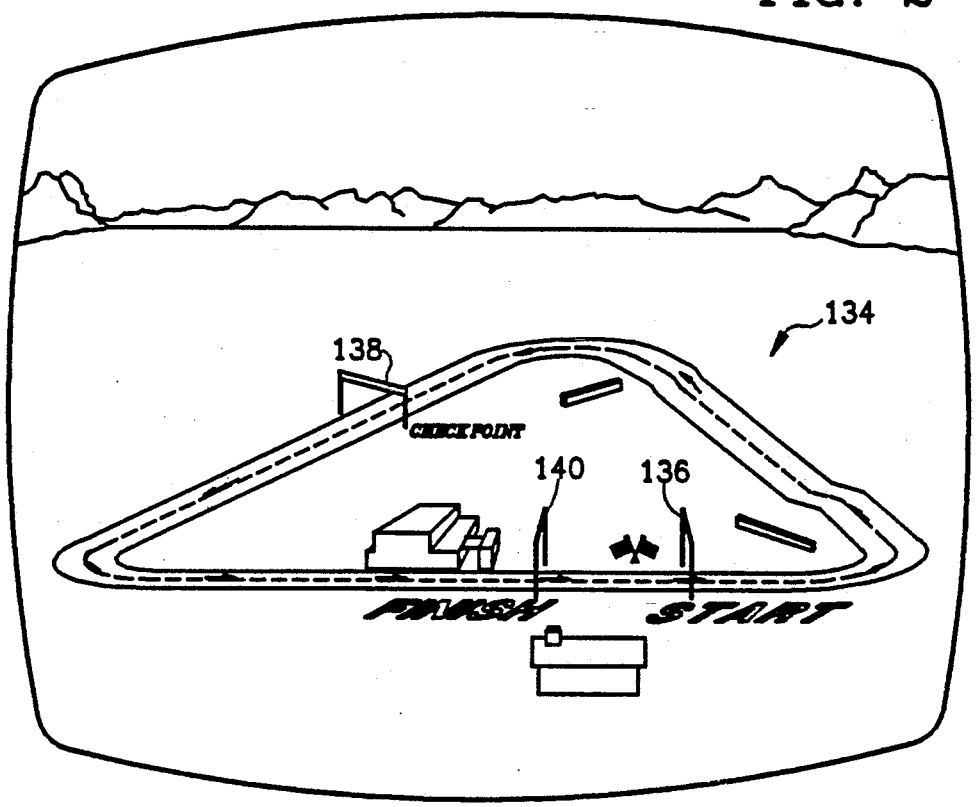
FIG. 2 is a diagram of an autocross racetrack corresponding to a video screen display provided by the arcade game of FIG. 1.

FIG. 2 is a diagram of a video screen display showing one example of a roadway, or track 134. In the embodiment of the present invention described herein, the user 102 (FIG. 1) is presented with the track 134 with a basic objective of trying to achieve better lap times while increasing his overall score. In point of fact, the user 102 presents the arcade game (hereinafter "system" to collectively describe the game and simulator embodiments) 100, with one or more coins. The system 100 then allows the user 102 a choice as to the type of track to run. The selected track can be the autocross track 134 shown in FIG. 2, a roadway having intersections and signal lights, a stunt course, and so on. As another option, and in the preferred embodiment, the system 100 allows the user 102 to select from a number of different models of the simulated vehicle. In a driver training system embodiment of the present invention, the cars to select from would preferably include simulations of the vehicles used for actual road tests.

Also shown in FIG. 2 is a start line 136, checkpoint 138 and finish line 140. When the user 102 begins the game, or initiates the system 100, the user's view is looking ahead at the start line 136 (e.g., FIG. 3). The checkpoint 138, which may be one of many (including the start and finish lines 138, 140 which are checkpoints), serves two fundamental purposes. First, a driver can increase his remaining time for playing the game by crossing the checkpoint 138 within some predetermined time, and he can increase the time of game play. Second, if the driver 102 crashes on the course near the checkpoint 138, the simulated car will be automatically reset to a position on the track 134 at the checkpoint 138. An instant replay capability shows the driver 102 what went wrong by playing back a "God's eye" view of the crash.

Figure 3:
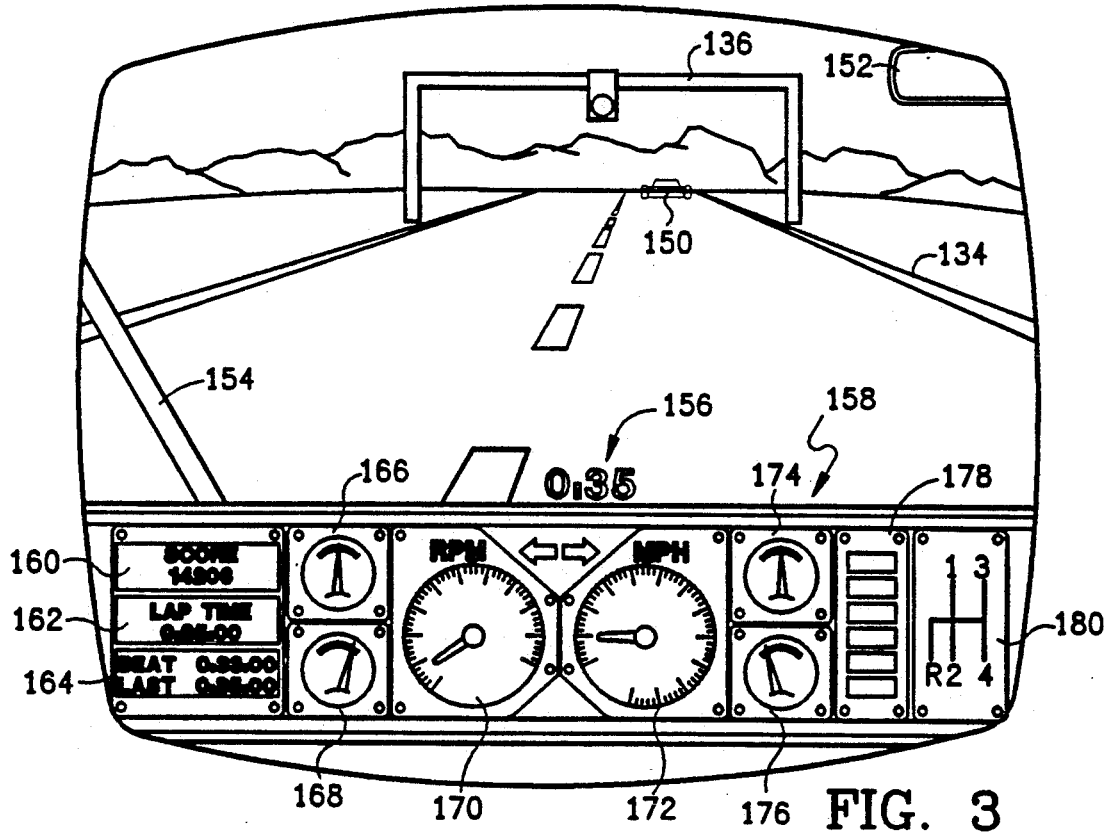
FIG. 3 is a diagram of the user's view before reaching the start line of the autocross track wherein the diagram corresponds to a video screen display of the arcade game shown in FIG. 1.

Referring now to FIG. 3, it can be seen that the user 102 (FIG. 1) is placed in the position of an observer inside of the vehicle being simulated. The diagram of FIG. 3 is a representation of another screen display generated on the video display 122 of FIG. 1. The scene represented in FIG. 3 is one wherein the user 102 is driving the simulation vehicle, also called the observer car (not shown), and is proceeding towards the start line 136. In a waiting position at the start line 136 is a "ghost" car or lap car 150.

The lap car 150 represents the best time around the track 134 in all the laps made by the driver 102 thus far. In this way, the driver 102 is provided with a means of self-improvement which is called recursive training. That is, at each iteration n around the track, the driver 102 tries to beat the best time accumulated in the past n−1 laps. For the arcade game embodiment of the system 100 described and shown herein, there is a single parameter of performance which is time. However, it will be understood that in other driver training systems there will be a multiplicity of parameters which may not necessarily include time. For example, a beginning driver would attempt to improve on safety parameters such as braking distances, centering the vehicle on the road, and so forth. Furthermore, in other variations of the invention the route through the simulated environment will not be a racetrack.

The ghost car 150 thus is a complete recording of the lap that was previously run by the user 102 which represents the current "best" of n−1 laps.

To provide a higher degree of realism in the system 100, certain aspects of the interior of the vehicle are displayed on the video display 122 (FIG. 1). For example, a portion of a rear view mirror 152 is shown in the upper right hand corner of the display. Also, an A-strut 154 of the simulated vehicle is shown in the center left of the video display 122. At the bottom of the display is a remaining time message 156 which is simulated as a message on the windshield such as would be provided, for example, by a heads-up display. In the preferred embodiment, accurate time is maintained by the processor 114 by counting the interrupts generated by a four millisecond interval timer (not shown).

Directly underneath the remaining time message 156, on the video display 122, is an instrument panel 158. The instrument panel 158, in the embodiment shown in FIG. 3, includes a score display 160. The score display 160 contains a numeric indicator of the user's performance. As discussed above, the score in the score display 160 is a function of, among other things, the driver 102 reaching the checkpoint 138 within a predetermined time. Beneath the score display 160 is a current parameter display 162. Thus, in the present embodiment, once the finish line 140 (FIG. 2) has been passed, the lap time is fixed and indicates the complete time of the last lap. Of course, for training an inexperienced driver, a time parameter may be inappropriate and some other set of parameters will be used to measure the driver's performance. Beneath the current parameter display 162 is a previous parameter display 164. The previous parameter display 164 contains the time to beat, or the time to qualify for a "championship lap" (determined by the current champion), and the last lap time. The last lap time is the current best lap time achieved by the user 102.

The instrument panel 158 shown in FIG. 3 also comprises an alternator gauge 166, a temperature gauge 168, a tachometer 170, a speedometer 172, an oil pressure gauge 174 and a fuel gauge 176. The gauges become active when the user 102 "starts" the simulated vehicle. Of principal significance to this discussion are the tachometer 170, to indicate when shifting should be performed, and the speedometer 172, to provide a measurement of velocity. The fuel gauge 176 reads empty when the game completes. On the right hand side of the instrument panel 158 is a set of warning lights 178 and a gear indicator 180. The gear indicator 180 visually displays the position of the gearshift 110 shown in FIG. 1.

Figure 4:
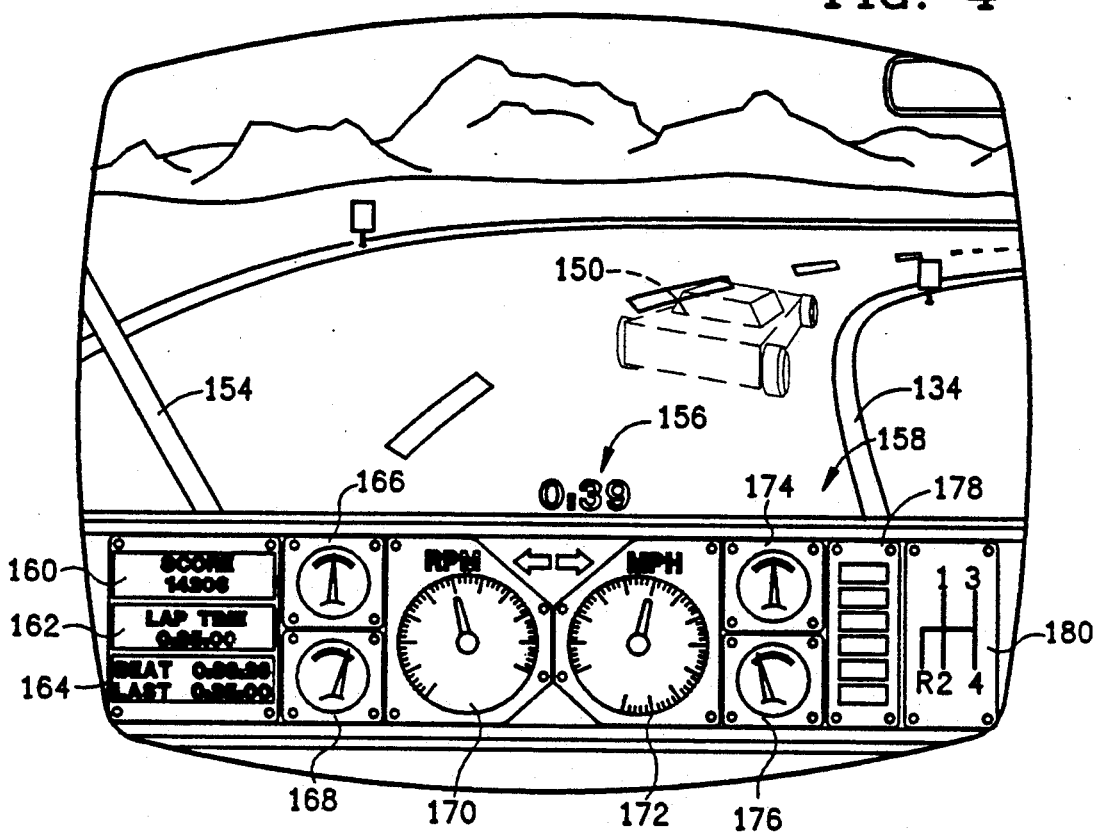
FIG. 4 is a diagram of the user's view while maneuvering around a curve in the autocross track wherein the diagram corresponds to a video screen display of the arcade game shown in FIG. 1.

FIG. 4 is another screen display wherein the lap car 150 is shown ahead of the observer car driven by the user 102. The lap car 150 is intentionally displayed as a wire frame model so that the user 102 may actually drive "through" the lap car 150 without the fear of a crash.

Figure 5:
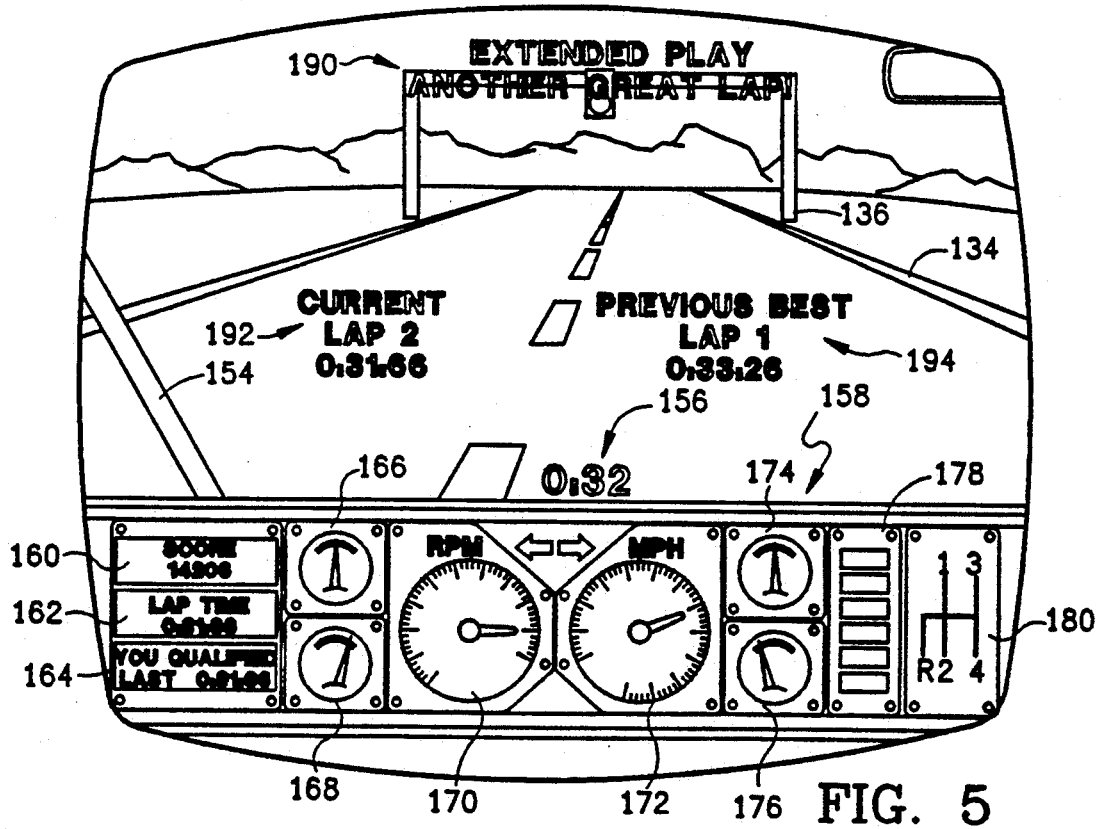
FIG. 5 is a diagram of the user's view just after crossing the finish line of the autocross track wherein the diagram corresponds to a video screen display of the arcade game shown in FIG. 1.

FIG. 5 is another screen display which is generated on the video display 122 of the system 100 (FIG. 1). The user 102 has just passed the finish line 140 (FIG. 2) and is approaching the start line 136. At the top of the screen there is displayed a predetermined feedback message 190, in this example, the words "EXTENDED PLAY—ANOTHER GREAT LAP!". Beneath the predetermined feedback message 190 there is also displayed a current lap feedback message 192 showing the current lap number and time, and a previous best lap feedback message 194 showing the previous best lap number and time.

Figure 6:
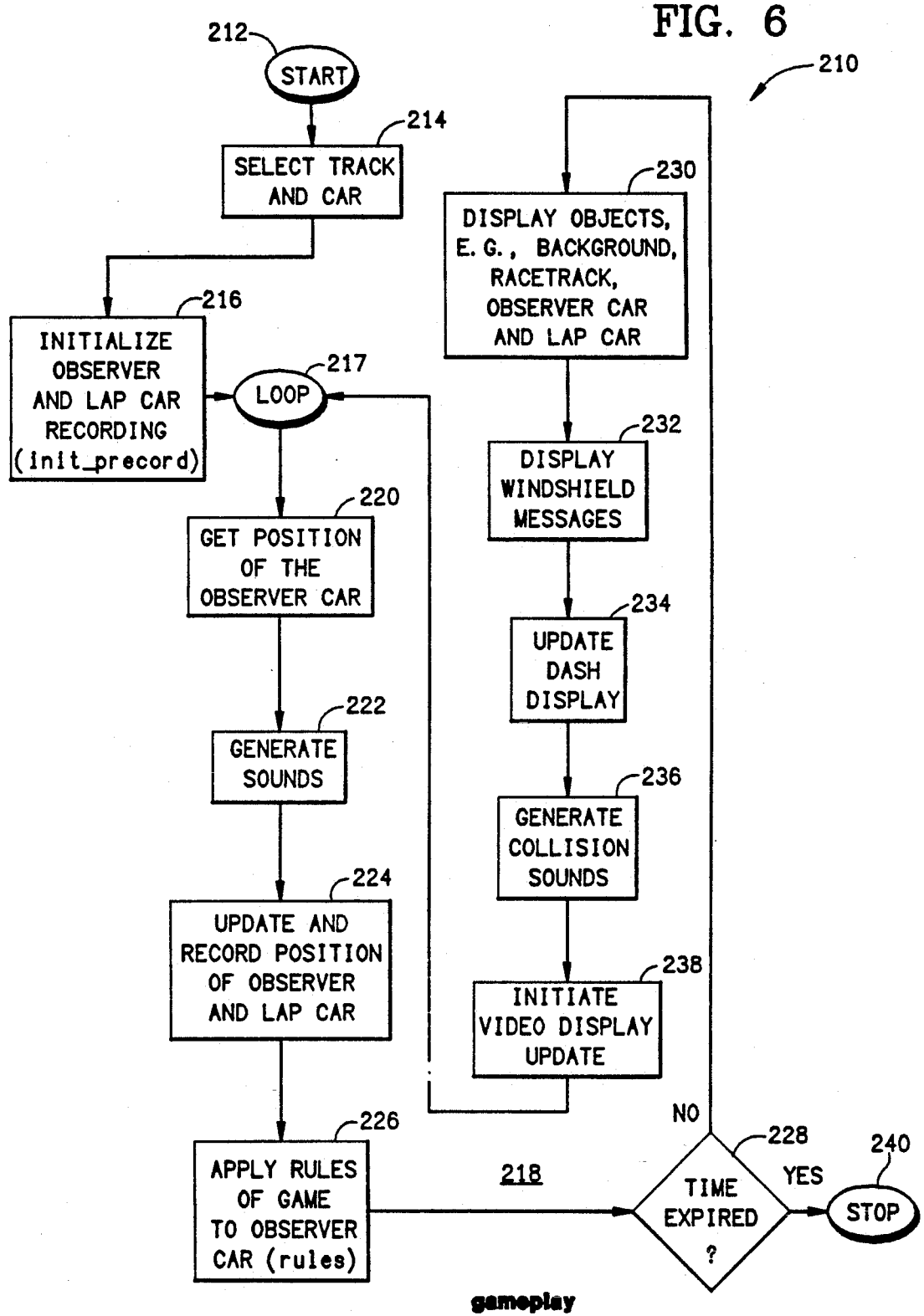
FIG. 6 is a flow diagram of the "gameplay" function which forms a portion of the game process shown in FIG. 1.

FIG. 6 illustrates the flow diagram for the top-level function of the game process 120 (FIG. 1) called "game_play" 210. In one preferred embodiment, the game process 120 is written in the "C" language and cross-compiled on a Digital Equipment Company VAX computer using a Green Hills Software, Inc. "C" compiler available from Oasys, a division of Xel, Inc. of Waltham, Mass. The game process 120 is then executed on a Motorola 68010 microprocessor located in the processor 114. However, one skilled in the art of computers will recognize that many other computer languages and computers, including pluralities of each, may be used to achieve the same result.

Beginning at a start state 212, the user 102 (FIG. 1) will insert money into the arcade game. Moving to a state 214 the processor 114 (FIG. 1) directs the video display 122 to display a menu of tracks from which the user 102 selects a track. Among the tracks to select are multiple player tracks and single player tracks such as the autocross track shown in FIG. 3. The user 102 is then prompted to select a car from among a menu of cars that is presented to the user.

Moving to a function called "init_precord" 216, the processor 114 initializes observer and lap car recording. The lap positions of the observer and lap cars are recorded, or saved, in unique buffers called "lap 1" and "lap 0", respectively. "Lap 0" is overwritten by "lap 1" whenever the observer car outperforms the lap car.

The processor 114 then moves to the beginning 217 of a loop 218 which only terminates when time has expired. For example, at the beginning of the game, the user 102 will be given an initial allocation of time. The time allocation may be increased by crossing checkpoints, completing laps, and so forth, but eventually the game will complete. The loop 218 is preferably completed at least five times per second so that position information can be displayed in real-time providing the loop car 150 and environment with fluid movement.

At a state 220, the position of the observer car is obtained from the model process 116. The model process 116 calculates the last position of the observer car based upon the user's inputs which occur asynchronously. Moving to the next state 222, the processor 114 generates the sounds that are appropriate for the observer car, for example, skidding sounds if the observer car is losing traction on the track 134 (FIG. 2).

Next, at a state 224, the recorded positions of observer and lap cars are updated. This means that the cars are placed in a certain position in the graphical universe or environment prior to the display system of the processor 114 (FIG. 1) actually updating the video display 122. In a function called "rules" 226, the processor 114 applies the rules of the game to the observer car. For example, if the user 102 crashed, or was off-road and unable to return to the track 134 within a predetermined time, then the position of the observer car is automatically reset to the nearest checkpoint.

At this point in the loop 218, moving to a decision state 228, the processor 114 checks to see whether time has expired. The time checked is the same allowed the user 102 by the system 100. This time is presented to the user 102 in the remaining time message 156 (FIG. 3).

Next, moving to a state 230 if time has not expired, a display command is initiated to a digital signal processor (not shown) in the processor 114 (FIG. 1), such as the ADSP-2100 chip available from Analog Devices of Norwood, Mass. In this state 230, display objects, such as the racetrack, background, observer car and lap car, are appropriately translated in the graphical universe according to the perspective of the user 102, for later display on the video display 122. In a state 232, windshield messages are displayed such as, for example, at the beginning of the game, checkpoints and the end of the game and the remaining time message 156 (FIG. 3) are displayed. Also, if the observer car goes off-road (i.e., off of the track 134), the system 100 displays arrows that point the user 102 in the direction of the track 134 (FIG. 2). Moving to a state 234, the lap time 162, score display 160 and gauges, including the tachometer 170 and speedometer 172, are updated. Then, at a state 236, collision sounds are generated. These are the sounds associated with the observer car colliding with barriers, cones, buildings, and the like. At a state 238, the video display 122 has its three-dimensional graphics display updated by a command being issued to a graphics signal processor such as, for example, the 34010 chip distributed by Texas Instruments, which can handle color filled three-dimensional graphics in real-time.

Returning to the decision state 240, if time has expired, the current session is terminated in a stop state 240.

Figure 7:
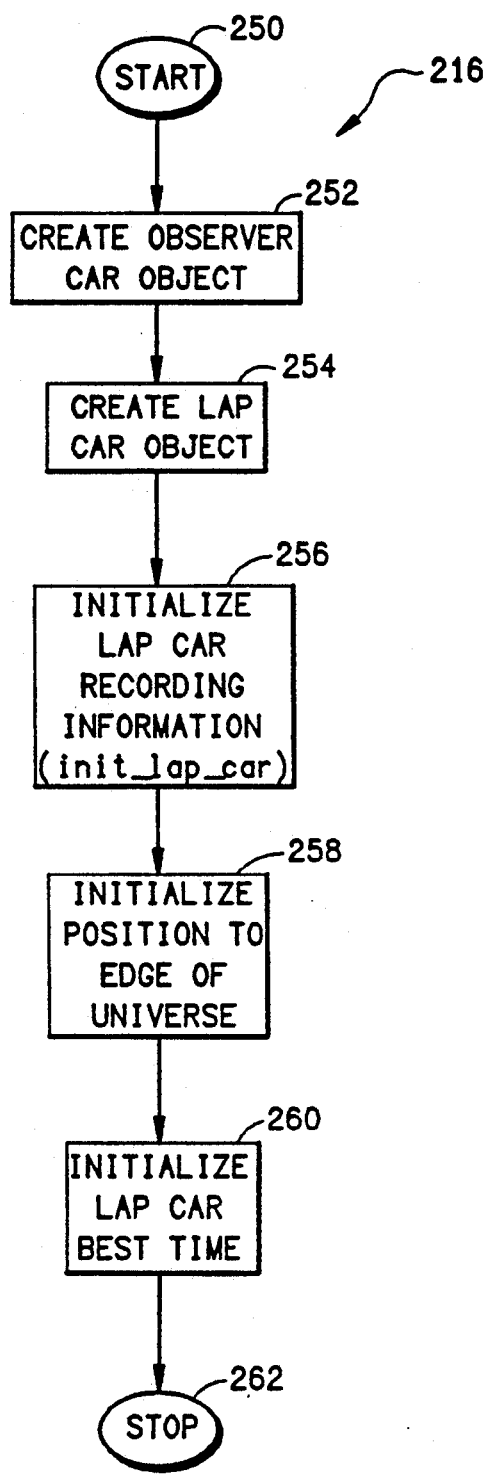
FIG. 7 is a flow diagram of the "init_record" function used by the "gameplay" function shown in FIG. 6.

Referring now to FIG. 7, there is illustrated the flow diagram for the "init_precord" function 216 shown in FIG. 6. Beginning at a start state 250, the processor 114 (FIG. 1) moves to a state 252 to create the graphical object called the observer car. The observer car object is created because there are times, for instance, after a crash during instant replay, when the system 100 zooms out of the observer car to show the user 102 the scene as from the point of view of a third party observer. At a state 254, the processor 114 creates the graphical object called the lap car, e.g., the car indicated at 150 in FIG. 4. Moving to a function called "init_lap_car" 256, lap car recording information is initialized in the circular buffer called "lap 0". Then, in a state 258, the position of the observer car object is set to the edge of the universe so that it is not seen on the video display 122 (until instant replay time, for example).

The lap car best time is initialized after the processor 114 moves to a state 260. The best time is set to be the highest possible time allowed by the system, e.g., 7FFFFFFF in hexadecimal notation. Thus, after the first lap, assuming there was not a crash or the user 102 did not abort the lap (the user may abort a lap by pushing an abort button (not shown)), the observer car will automatically become the new lap car with the first lap time displayed in the previous parameter display 164 shown in FIG. 3. The function 216 then terminates at a stop state 262.

Figure 8:
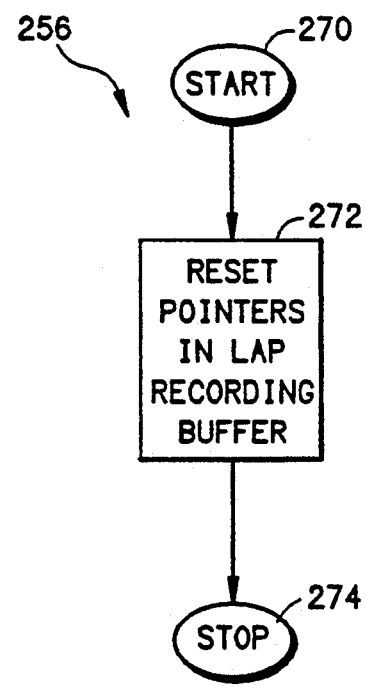
FIG. 8 is a flow diagram of the "init_lap_car" function used by the "init_precord" function of FIG. 7.
Figure 9:
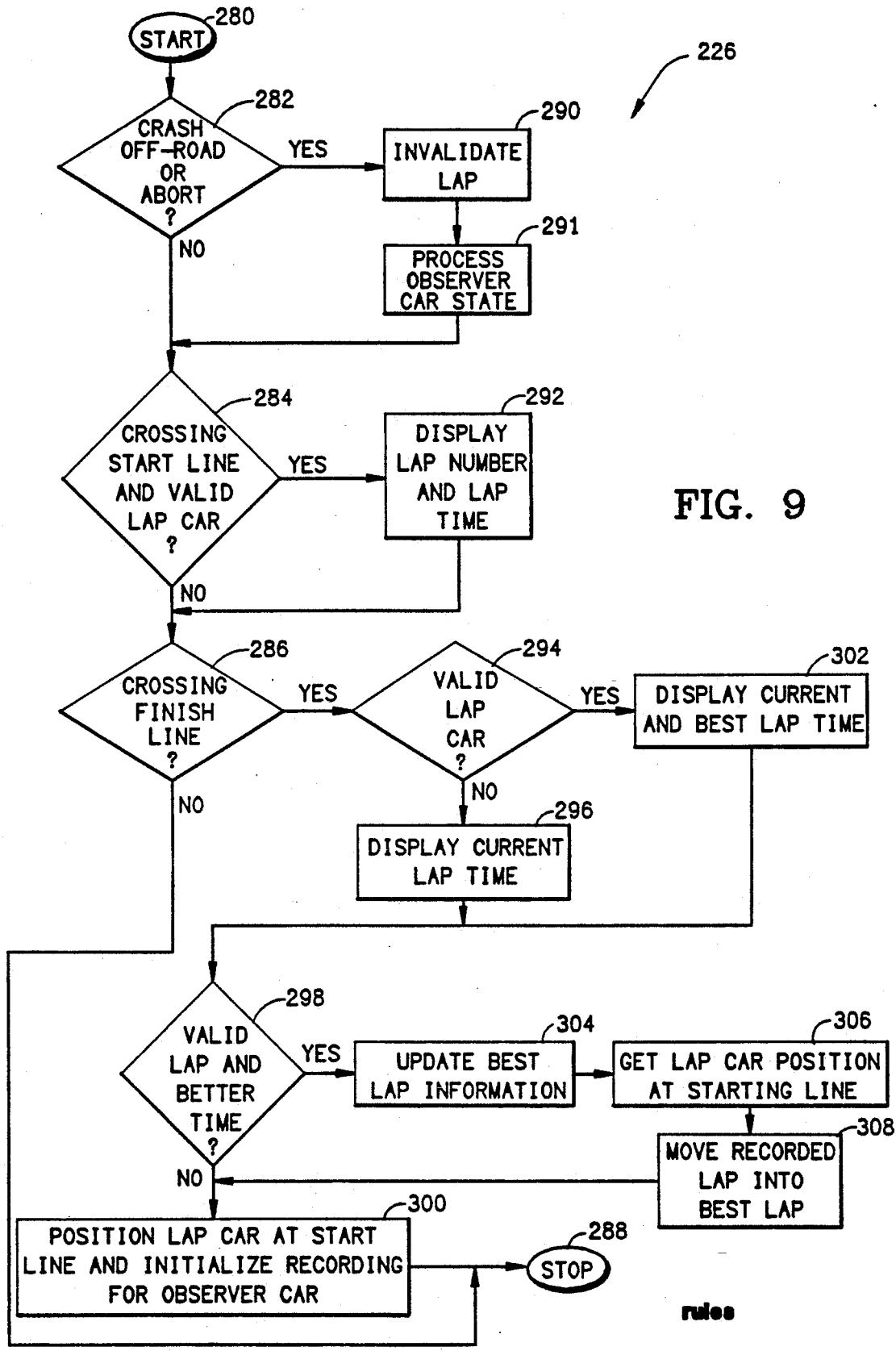
FIG. 9 is a flow diagram of the "rules H function used by the "gameplay" function shown in FIG. 6.

FIG. 8 illustrates the flow diagram for the "init_lap_car" function 256 shown in FIG. 7. The "init_lap_car" function 256 is entered at a start state 270 by the processor 114 (FIG. 1) at the beginning of each game as shown in FIG. 7, and also at the end of a lap if a new lap car is to be recorded as shown in FIG. 9. At a state 272, pointers to the lap car recording buffer "lap 0", such as the last lap position, are reset. Also a playback flag is reset to indicate that the buffer does not contain valid information and therefore should not be displayed. The "init_lap_car" function 256 terminates in a stop state 274.

FIG. 9 illustrates the flow diagram for the "rules" function 226 shown in FIG. 6. Beginning at a start state 280, the processor 114 (FIG. 1) moves to a decision state 282. Among the functions carried out by "rules" 226 is if the observer car goes off-road for more than some predetermined time, say ten seconds, for example, then the car is replaced onto one of the checkpoints such as the checkpoint 138 shown in FIG. 2. At a decision state 282, if the observer car is not crashed, not off-road and the game has not been aborted, then a decision state 284 tests whether the observer car is crossing the start line and there is a "valid" lap car. By valid, it is meant that the car did not crash and the lap was not aborted. If the lap car is valid, then another test is made to determine whether the observer car is crossing the finish line at a decision state 286. If the observer car is not crossing the finish line, then processing for the "rules" function terminates at a stop state 288.

Referring back to the state 282, if the observer car is either crashed, off-road or the lap was aborted, then the processor 114 moves to a state 290 to invalidate the lap and continues processing at the state 284. Moving to a state 291, the processor 114 processes the observer car state, such as resetting the observer car to the nearest checkpoint if the observer car was crashed.

If at the decision state 284 the lap car is crossing the start line and there is a valid lap car, then the lap number and lap time are displayed at a state 292 and control returns to the decision state 286.

Referring back to the decision state 286, if the observer car is crossing the finish line, the processor 114 moves to a decision state 294. If, at the decision state 294, there is no valid lap car, then the current lap time is displayed at a state 296 and control continues to a decision state 298. In the decision state 298, the processor 114 tests whether it is a valid lap and a better time was run. If not, then control moves to a state 300 to position the lap car at the start line and initialize recording for the observer car. State 300 uses the "init_lap_car" function shown in FIG. 8. At this point in the processing, the user 102 sees the rear-end of the lap car as, for example, shown in FIG. 3.

Referring back to the decision state 294, if there is a valid lap car then the processor 114 moves to a state 302 to display current and best lap times, e.g., the messages 192 and 194 in FIG. 5, before entering the decision state 298.

From the decision state 298, if it is a valid lap and a better time was achieved, then the processor 114 moves to a state 304 to update the best lap information. Moving next to a state 306, the processor 114 gets the lap car position at the starting line and stores the position and, at a state 308, moves the recorded lap buffer information stored in "lap 1" into the best lap buffer "lap 0", moving from the state 308 to the state 300 and proceeding as described above.

Although the preferred embodiments of the present invention have been principally shown and described as relating to arcade games, the present invention could also be used as a vehicle simulator such as a driver training system.

Although the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention.

What is claimed is:

1. A driver training system for a user of a simulated vehicle, comprising:
   a plurality of simulated input devices for controlling said simulated vehicle;
   a video device for presenting said user with a view of a simulated environment;
   modeling means responsive to said input devices for determining position information of said simulated vehicle in said simulated environment;
   a memory including present and previous buffers;
   recording means responsive to said position information for storing a present route of said simulated vehicle through said simulated environment and at least one parameter indicative of the present route in the present buffer; and
   recursive training means for storing a previous route of said simulated vehicle through said simulated environment and at least one parameter indicative of the previous route in the previous buffer;
   wherein said previous route is communicated along with the present route to said video display; and
   wherein in a first present route, the position information and parameter of the first present route is stored in the previous buffer so that information in the previous buffer is overwritten and thereby no prerecorded information remains in the previous buffer, and for every successive present route through the simulated environment after the first present route, a best route through the simulated environment is selected by comparing the stored previous and present route parameters and the selected best route and parameter is stored in the previous buffer so that each and every previous route represents the best route only with respect to each and every one of its respective preceding previous route and the present route.

2. The system defined in claim 1 wherein said input devices include a gas pedal, brake pedal and steering wheel.

3. The system defined in claim 2 wherein said input devices further include a gearshift.

4. The system defined in claim 3 wherein said input devices further include a clutch pedal.

5. The system defined in claim 3 wherein said steering wheel is responsive to feedback signals from said recursive training means.

6. The system defined in claim 1, additionally comprising a speaker responsive to said recursive training means.

7. A system for driver training, comprising:
   a plurality of simulated controls having analogues to controls of a real-world vehicle;
   a visual device;
   a processor responsive to said simulated controls for generating personalized feedback including a simulated environment, a present simulated vehicle having a present route and present parameter and a previous simulated vehicle, wherein the previous simulated vehicle is a recording of a previous route and previous route parameter through an environment that maximizes at least one parameter indicative of any one previous route with respect to other previously simulated routes according to a preselected maximization criteria, and wherein said personalized feedback is communicated to said visual device for presentation to a user; and
   means for comparing said parameters of said previous route and said present route including buffers for recording said previous and said present routes and parameters, wherein in a first present route, the route and parameter of the first present route is stored in said previous buffer so that no prerecorded route and parameter remains in said previous buffer, and for every successive present route through the simulated environment after the first present route, said present route is recorded and selected to replace said recorded previous route only if the present parameter satisfies the maximization criteria.

8. The system defined in claim 7, wherein the parameter to be compared is time to traverse a route and the maximization criteria is the least time for a route to be traversed.

9. The system defined in claim 7, wherein the simulated vehicle is a vehicle that moves over roads.

10. The system defined in claim 7, wherein the personalized feedback includes a three-dimensional graphical representation of the simulated environment.

11. The system defined in claim 7, wherein the processor includes a model process for determining position information of the vehicle.

12. In a system for a simulating a vehicle, the system having a processor, a set of input devices, and display means for displaying a simulated environment, a method of recursive driver training comprising the steps of:
   (a) receiving signals from the input devices into the processor, said signals indicative of a change in vehicle position;
   (b) calculating in the processor position information of the simulated vehicle based on previous position information and the changes indicated by the signals;

(c) storing in the processor a sequence of position information indicative of a present route through the simulated environment;
(d) measuring in the processor at least one parameter indicative of the present route;
(e) selecting in the processor a best route, wherein on the first present route the first present route is the best route and on successive present routes the best route selected by comparing the parameter of the present route against the parameter of the previous route;
(f) storing in the processor the best route as the previous route according to the result of the comparison;
(g) simultaneously displaying by the display means a view of the simulated environment at each calculated position indicative of the present route and a vehicle indicative of the previous route; and
(h) repeating steps (a)-(g) a plurality of times.

* * * * *